United States Patent [19]

Gräff

[11] Patent Number: 4,509,272
[45] Date of Patent: * Apr. 9, 1985

[54] METHOD AND APPARATUS FOR DRYING MOIST EXHAUST AIR FROM ONE OR MORE BULK MATERIAL DRYING HOPPERS

[76] Inventor: Roderich W. Gräff, 1311 Pine Valley Ct., Ann Arbor, Mich. 48104

[*] Notice: The portion of the term of this patent subsequent to Nov. 8, 2000 has been disclaimed.

[21] Appl. No.: 359,114

[22] Filed: Mar. 17, 1982

[51] Int. Cl.³ .............................................. F26B 3/14
[52] U.S. Cl. .......................................... 34/27; 34/32; 34/53; 34/54; 34/80; 34/169; 55/217; 55/387
[58] Field of Search .................. 34/27, 28, 29, 32, 34, 34/54, 80, 169, 174, 53; 55/217, 179, 387

[56] References Cited

U.S. PATENT DOCUMENTS 3,487,608  1/1970  Graff ........................................ 55/33
3,621,585  11/1971 Robertson ............................... 34/10

FOREIGN PATENT DOCUMENTS 2742297  3/1979  Fed. Rep. of Germany ........ 34/169

Primary Examiner—Larry I. Schwartz
Attorney, Agent, or Firm—Wood, Herron & Evans

[57] ABSTRACT

The exhaust air from a bulk material drying hopper is conveyed through a chamber filled with an adsorbing medium and the air is fed back to the drying hopper in a closed circuit. The chamber is regenerated at intervals by a counterflow of drying gas. The frequency of regenerating the chamber is controlled as a function of the temperature of the exhaust air.

5 Claims, 1 Drawing Figure

U.S. Patent
Apr. 9, 1985
4,509,272
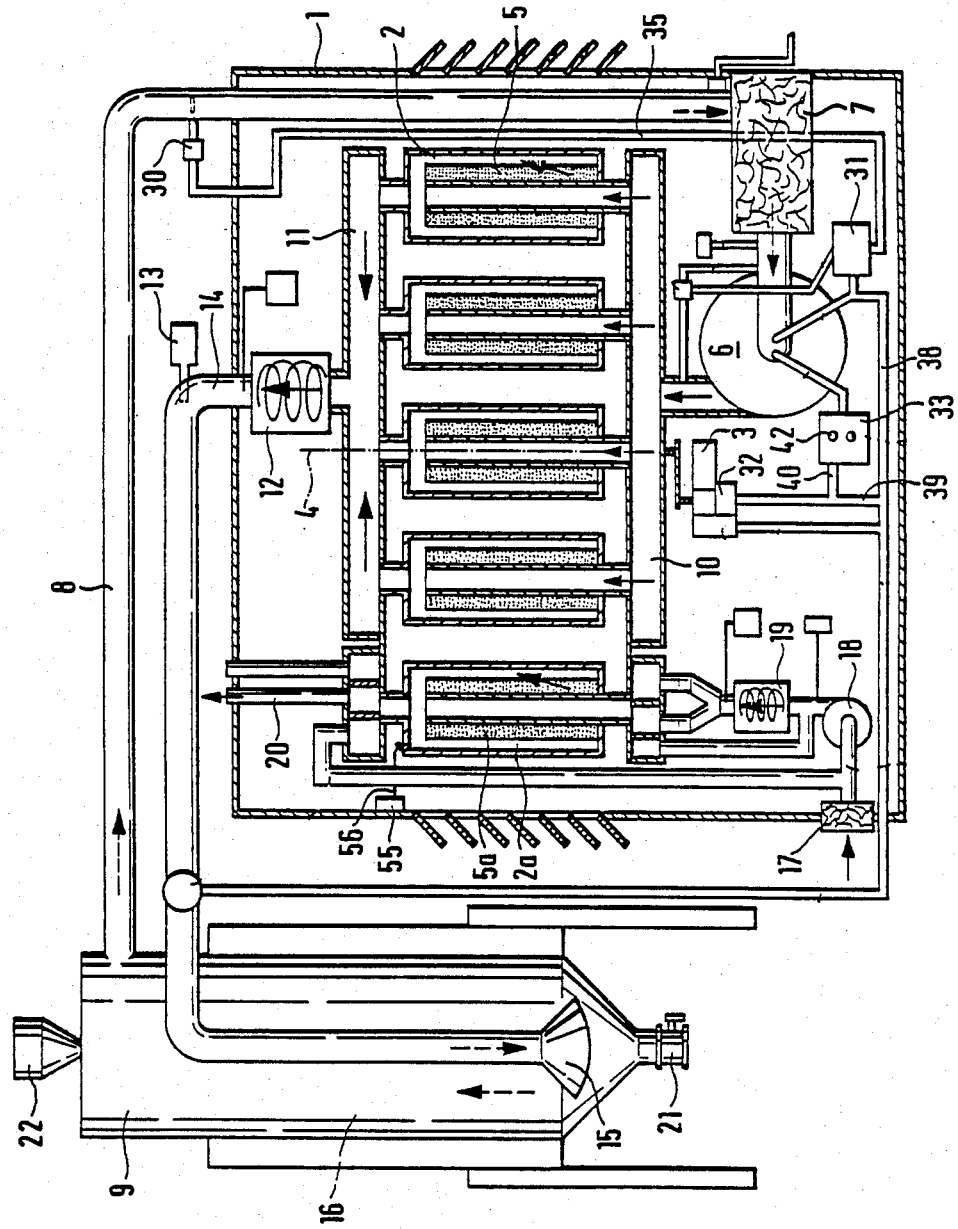

METHOD AND APPARATUS FOR DRYING MOIST EXHAUST AIR FROM ONE OR MORE BULK MATERIAL DRYING HOPPERS

The invention relates to a method of drying exhaust air from at least one bulk material drying hopper, the said exhaust air being conveyed through at least one chamber filled with an adsorbing medium and being fed back to the drying hopper or hoppers in a closed circuit, wherein the chambers are regenerated at intervals in a second air circuit, and to an apparatus which is particularly suited to carrying out the method.

In order to dry bulk materials of all types, in particular plastics powders and granulates, in the bulk material drying hopper, hot dry drying air is blown into the drying hopper through the supply air pipe opening in the lower portion of the drying hopper, flows counter to the bulk material sinking through the drying hopper, heats the said bulk material, absorbs moisture therefrom while cooling and leaves the drying hopper at its upper portion through the exhaust air pipe. The damp exhaust air is then conveyed through a chamber filled with an adsorbing medium and arranged in a drier and is forced through a heating device into the supply air pipe again by the blower.

If the quantity of bulk material sinking through the drying hopper from the top to the bottom per unit of time is reduced, the temperature of the exhaust air rises. A rise of the temperature of the exhaust air indicates therefore a reduced throughput of bulk material through the hopper and a correspondingly reduced moisture content of the exhaust air. To this end the method named above is effected according to the invention such that the frequency of regenerating the chamber containing the adsorbing medium is controlled as a function of the exhaust air temperature. By slowing down the regeneration frequency as the temperature of the exhaust air rises the moisture adsorbing capacity of the adsorbing medium within the chamber is more fully utilized and thus energy for the regeneration process is saved.

The invention also provides an apparatus for drying damp exhaust air supplied from a bulk material drying hopper by way of an exhaust air pipe, comprising at least one chamber filled with an adsorbing medium, a regeneration device for the chamber and a blower, the pressure side of which is connected to a supply air pipe leading into the drying hopper and provided with a heating device, a temperature sensor influencing a control device and being arranged in the exhaust air pipe. This apparatus allows the method according to the invention to be carried out in a particularly simple manner. The control device controls the regeneration device for the chamber such that the regeneration device switches the chamber into the regeneration phase after a longer adsorbing period when the temperature sensor signals the control device a rise of temperature of the exhaust air. Thus, the regeneration frequency of the chambers may be reduced in the same ratio as the temperature of the exhaust air rises above a reference value which is normally slightly above ambient temperature. This represents a major saving in energy, since in the case of dry air driers the regeneration process has a relatively high energy requirement. By this use of the control device the use of expensive moisture sensors, by means of which the regeneration frequency could be controlled, is dispensed with. Alternatively, the further development of the invention provides for a manually operable control device for controlling the frequency of regeneration which may be adjusted according to the type of the bulk material present which is to be dried in its moisture content with reference to predetermined guidelines.

The apparatus according to the invention may be equipped with a regeneration device as particularly disclosed in U.S. Pat. No. 3,972,129 according to which a set of valves is pressure-controlled by a blower such that a counterflow of drying gas is directed through the stationary chamber during the regeneration phase. In this embodiment of the invention the control device applies regeneration signals to the blower in response to temperature rise signals received from the temperature sensor for initiating regeneration. Alternatively, the invention may be applied to a drier disclosed in U.S. Pat. No. 3,487,608, FIG. 2 (the so called Whitlock-dryer) having two adsorbing chambers controlled by two four-way valves in such a way that one chamber is connected to the adsorption circuit while the second chamber is regenerated. In accordance with the invention the frequency of regeneration is controlled by delaying the change-over times from regeneration into adsorption and vice versa. Moreover, the apparatus may comprise a set of rotary type chambers as also disclosed in U.S. Pat. No. 3,487,608 wherein some of the chambers are in the process of drying exhaust air while others are regenerated by being rotated into a separate regeneration circuit. The invention is carried out either by reducing the speed of rotation of the chambers or by stopping intermittently the rotation as controlled by the temperature sensor via the control device.

The invention is explained in detail below with reference to the embodiment illustrated in the accompanying drawing which is a diagrammatic cross-sectional view of a bulk material drying hopper with a drier.

In a housing 1 of a dry air drier five chambers 2 are arranged on a rotating frame as disclosed in U.S. Pat. No. 3,487,608 which is slowly rotated by a drive motor 3 about its axis 4. The chambers are filled with an adsorbing medium 5. A blower 6 sucks air via a filter 7 from an exhaust air pipe 8 which is connected to a bulk material drying hopper 9, and forces it via a distributing duct 10 through four of the five chambers 2 filled with the adsorbing medium 5. The drying air flows from these chambers via a collecting duct 11 through a heater 12 which is adjusted to the desired preheating temperature of the emergent drying air by a thermostat 13, and via a supply air pipe 14 to the drying hopper 9. The supply air pipe 14 opens into an air distributor 15 which extends deep into the drying hopper 9. The dry preheated drying air now slowly rises up through the plastics granulate 16, adsorbs the moisture of the latter and gives off part of its heat. The cycle then begins again via the exhaust air pipe 8 and the filter 7.

Of the five chambers 2 the chamber 2a shown on the left in the drawing is connected in a regeneration circuit which is completely separate from the circuit of the drying air and in which a further filter 17, a blower 18 and a heater 19 are arranged. The blower 18 draws in outside air via the filter 17 and forces it via the heater 19 through the adsorbing medium 5a saturated with moisture into the chamber 2a. The heated air adsorbs the moisture of the adsorbing medium 5a in the chamber 2a and escapes into the atmosphere via the tube 20.

As soon as the regeneration process of the adsorbing medium, i.e. the removal of the moisture, is completed, the newly regenerated chamber 2a is rotated into the dry air circuit by the motor 3 and is available for drying air, while an adjacent chamber heavily saturated with moisture is rotated into the regeneration circuit. The quantity of dried granulated material 16 removed at the removal box 21 of the drying hopper 9 is continuously replaced by damp granulated material from the conveying means 22.

The temperature-sensitive element of a temperature sensor 30 extends into the exhaust air pipe 8 and detects the temperature of the exhaust air from the drying hopper 9. The temperature sensor 30 is connected to an input of a control device 31 by way of an output line 35 and transmits a signal corresponding to the detected temperature of the exhaust air to the control device 31. The control device 31 compares the detected temperature of the exhaust air with a nominal value which corresponds, for example, to a temperature slightly above room temperature. If the temperature sensed by the temperature sensor 30 is substantially above the reference value such temperature rise indicates that the throughput of the bulk material through the hopper 9 has decreased and therefore the exhaust air carries less moisture. Consequently, the control device 31 generates a slow-down signal depending upon the result of the comparison of the temperature signal as received from the temperature sensor to the reference value. Said slow-down signal is delivered by the control device 31 on line 38 and is received by a regeneration frequency determining device 32 the input of which is connected to line 38 through a branching line 39. When receiving the slow-down signal the regeneration frequency determining device 32 causes the drive motor 3 to retard regeneration of chamber 2 by slowing down or intermittently interrupting rotation of the fame. The amplitude of the slow-down signal is related to the deviation of the temperature signal received by the control device 31 from the temperature sensor 30 to the reference value. Therefore, the extent of delay of the beginning of regeneration of chamber 2 as introduced by the drive motor 3 depends on the extent the temperature of the exhaust air rises above the reference value. Thus, switching the chamber 2 into the regeneration circuit can be deferred up to a tolerable period of time. Thereby, the moisture adsorbing capacity of the adsorbing medium 5 within the chamber 2 is more fully utilized and energy for the regeneration process is saved.

The line 39, which leads from the branch line 38 to the device 32, may also be acted upon by a signal from a control device 33 via the line 40 when one of the manually operable adjustment knobs 42 is set so as to prolong the regeneration cycle period in accordance with a predetermined tabular value. The tabular value takes into consideration the nature of the plastics granulated material contained in the drying hopper 9, the hourly throughput through the drying hopper and its moisture content.

A position sensor 55, the sensor 56 of which is contacted by a regenerated chamber 2a during its advance through the regeneration phase, is also secured in the housing 1 in the path of the chamber 2a. The position sensor 55 controls, in a manner not shown, the drive motor 3 for the rotating frame with the chambers 2, 2a and the other chambers not provided with reference numerals. In this way, before bringing a regenerated chamber into the drying phase, the rotating frame is detained until the chamber which has remained in the drying phase the longest is sufficiently saturated.

In the above description and in the claims the term "air" also embraces ordinary gases, such as nitrogen, the use of which is recommended in many cases according to the granulated material to be dried and/or the dry mass in the drier.

I claim:

1. In a method of drying exhaust air from one or more bulk material drying hoppers, comprising the steps of conveying exhaust air from a bulk material drying hopper through at least one chamber filled with an adsorbing medium and feeding the air back to the drying hopper in a closed circuit, the chamber being regenerated at intervals by a counterflow of drying gas, the improvement comprising the step of controlling the frequency of regeneration the chamber as a function of the temperature of the exhaust air from the drying hopper.

2. The method of claim 1, in which the frequency of regeneration the chamber is slowed down in a substantially proportional relation to a rise of the temperature of the exhaust air.

3. In an apparatus for drying moist exhaust air supplied from one or more bulk material drying hoppers, including an exhaust pipe connected to said bulk material drying hoppers for carrying said moist exhaust air therefrom, a blower whose suction side is connected to said exhaust pipe, at least one chamber filled with an adsorbing medium connected to the pressure side of said blower and operable to remove moisture from said moist exhaust air, a regeneration device adapted to remove moisture from said adsorbing medium of said chamber, a supply air pipe and a heater connected between said chamber and said bulk material drying hoppers, the improvement comprising a sensor for sensing the temperature of said moist air within said exhaust pipe, a control device connected to said sensor, and a device for determining the regeneration frequency of said adsorbing medium of said chamber, said control device being operable to send a signal to control said device for determining the frequency of regeneration of said adsorbing medium of said chamber, said signal being related to the temperature of the moist air within said exhaust pipe.

4. The apparatus of claim 3, including a manually operable control device for controlling the regeneration frequency of the chamber.

5. The apparatus of claim 3, including a position sensor on a rotating frame comprising a plurality of chambers, and a delaying element controlled by the position sensor, for temporarily reducing the speed or interrupting the rotation of the rotating frame.

* * * * *

UNITED STATES PATENT AND TRADEMARK OFFICE
CERTIFICATE OF CORRECTION

PATENT NO. : 4,509,272

DATED : April 9, 1985

INVENTOR(S) : Roderich Wilhelm Graff

It is certified that error appears in the above-identified patent and that said Letters Patent is hereby corrected as shown below:

On the title page add:

[30] Foreign Application Priority Data

West Germany        P. 3110873        March 20, 1981

Signed and Sealed this

Fifteenth Day of July 1986

[SEAL]

Attest:

DONALD J. QUIGG

Attesting Officer      Commissioner of Patents and Trademarks